Sept. 15, 1925.  P. W. GRAY  1,554,084
APPARATUS FOR INDICATING THE RATE OF TURN OF AIRCRAFT
Filed May 19, 1922  2 Sheets-Sheet 1
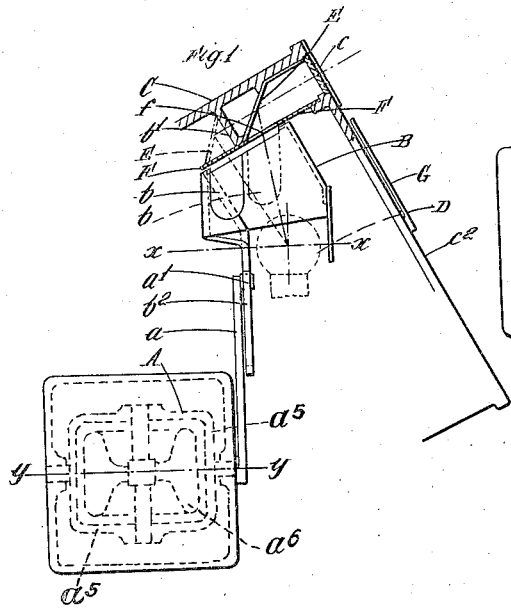
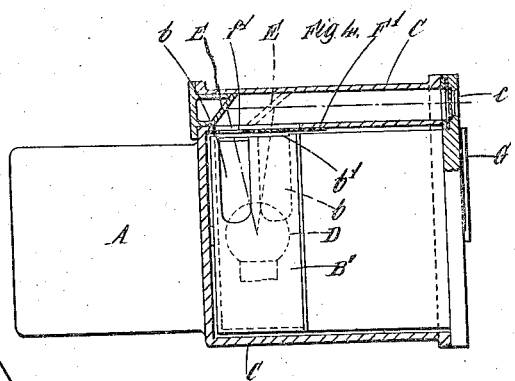
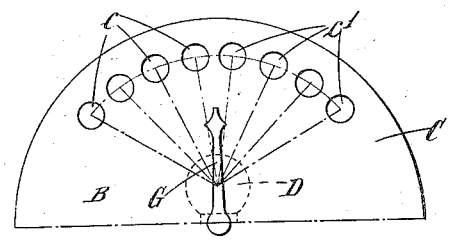
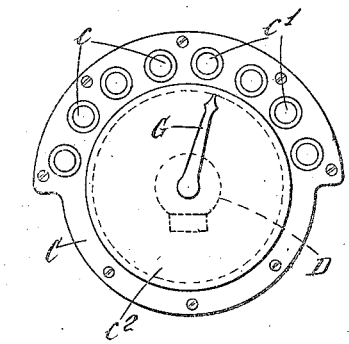
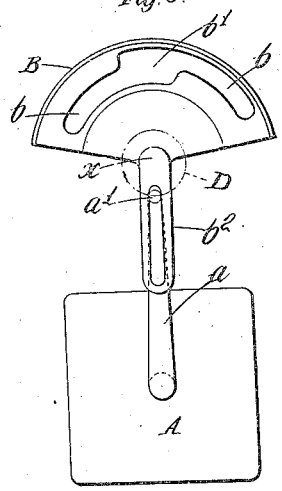

Sept. 15, 1925. 1,554,084
P. W. GRAY
APPARATUS FOR INDICATING THE RATE OF TURN OF AIRCRAFT
Filed May 19, 1922 2 Sheets-Sheet 2
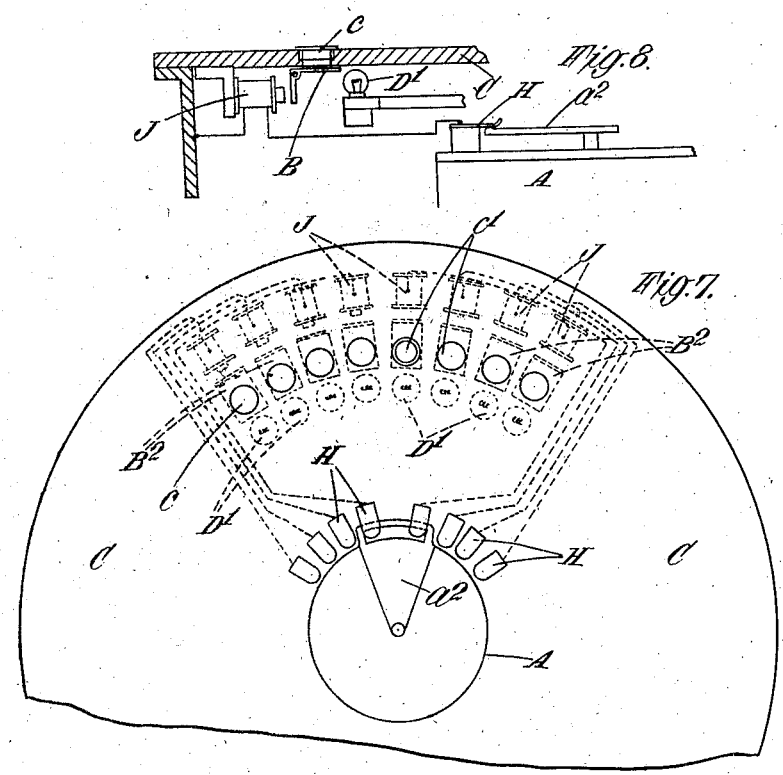
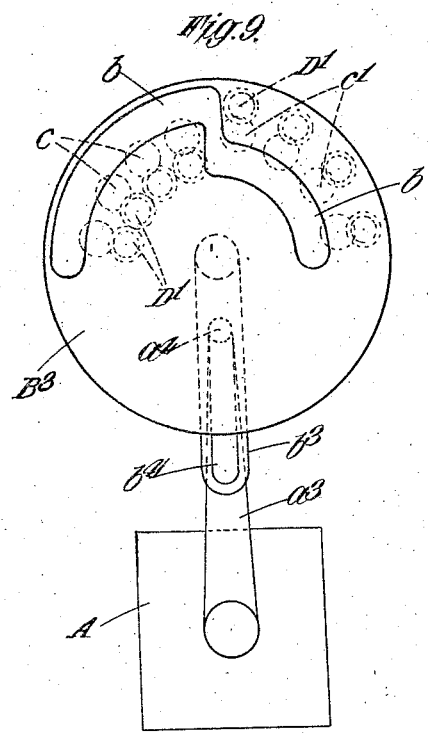
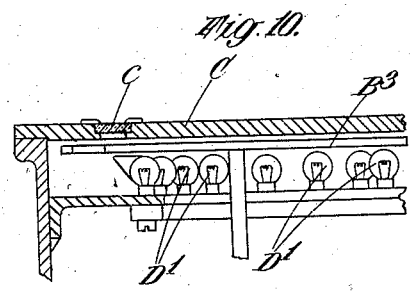

Patented Sept. 15, 1925.

1,554,084

UNITED STATES PATENT OFFICE.

PERCY WILLIS GRAY, OF STREATHAM, LONDON, ENGLAND, ASSIGNOR TO VICKERS LIMITED, OF WESTMINSTER, LONDON, ENGLAND, A BRITISH COMPANY.

APPARATUS FOR INDICATING THE RATE OF TURN OF AIRCRAFT.

Application filed May 19, 1922. Serial No. 562,167.

*To all whom it may concern:*

Be it known that I, PERCY WILLIS GRAY, a subject of the King of Great Britain, residing at 1 Clairview Road, Streatham, in the county of London, England, have invented certain new and useful Improvements in Apparatus for Indicating the Rate of Turn of Aircraft, of which the following is a specification.

This invention relates to gyroscopically controlled optical apparatus by which the rate of turn of aircraft is indicated to the pilot, the chief object of the invention being to provide an improved illuminating apparatus which will indicate, preferably by coloured lights, the rate and direction of turn or whether the aircraft is flying straight.

According to this invention the gyroscope effects the operation of a plurality of illuminating devices lit by a lamp or lamps independent of the gyroscope and remaining constantly alight, the gyroscopically controlled illuminative devices showing lights, preferably of different colours, according to the direction and rate of turn. The gyroscope may actuate shutters, screens, reflectors or equivalent mechanical devices which give the illuminative indications to the pilot.

In order that the said invention may be clearly understood and readily carried into effect, the same will now be described more fully with reference to the accompanying drawings, in which:—

Figure 1 is an elevation partly in section of one construction of apparatus embodying this invention.

Figure 2 shows the face of the indicator.

Figure 3 is an elevation at right angles to Figure 1 showing the gyro-operated part of the mechanism.

Figure 4 is a section and Figure 5 is an elevation of a modified construction of the apparatus.

Figure 6 is a developed view of rotatable and fixed screens of the modified apparatus.

Figs. 7 and 8 are, respectively, a face view and the detail section of a modification with electrical control and a plurality of lamps; and Figs. 9 and 10 are corresponding views of a further modification.

The drawings are of a more or less diagrammatic type and illustrate only such parts of the apparatus as are necessary for the purpose of the invention.

A is the gyroscope. B is a rotatable screen or shutter controlled by the gyroscope. C is a casing provided at the front with windows $c$, $c'$ arranged in an arc of a circle and divided into two groups. D is a lamp adapted to illuminate the windows $c$, $c'$ through the reflectors E, the windows with the illuminating means forming the illuminative indicators observed by the pilot.

Referring to the construction illustrated in Figures 1, 2 and 3, the gyroscope A is provided with an arm $a$ secured to the gimbal ring $a^5$ carrying the gyro wheel $a^6$ so that precessional movement of the gyroscope causes the arm $a$ to turn. The gyroscope (shown diagrammatically as this part of the apparatus is of known type) is mounted with its gyro axis normally horizontal, and any rotation of the aircraft around a vertical axis carries round with it the gyro axis, the horizontal gimbal axis, that is, the axis $y$—$y$ of the ring $a^5$ being fixed in the aircraft, and this causes, as in known gyroscopic rate of turn indicators, a precessional movement of the gimbal around its fixed axis against spring control, the turning of the aircraft causing a precessional movement of the gimbal until the precessional force is balanced by the opposing spring force, so that the angle through which the gimbal and consequently the arm $a$ turn is a measure of the rate of turn of the aircraft.

The rotatable screen B turns on a horizontal axis $x$—$x$ parallel to the axis $y$—$y$ of the gyroscope gimbal and arm $a$ and as the casing C is sloping (for mounting, for example, on a sloping dashboard) the screen B is of conical form as indicated in Figures 1 and 3. It turns within a fixed cylindrical screen F, having perforations $f$ corresponding to the number of windows $c$, $c'$ and situated in line with the reflectors E, one of which is placed behind each of the windows. The rotatable conical screen B, as it is not co-axial with the fixed screen F, has its surface parallel and adjacent to the screen F only along the middle line of the part cone. The reflectors E and the perforations $f$ are arranged in two rows, so that a single slot $b$ in the rotatable screen B will serve to expose one or more of the windows at either side, according to the direction of movement of the screen, while cutting off illumination of the windows at the other side.

The slot $b$, as shown in Figure 3, has two staggered arms joined by a central portion $b'$ of double width, and the reflectors E are arranged at different distances from the windows, those behind the windows $c$, for example, being placed forward, while those behind the second set of windows $c'$ are placed further back, so as to correspond to the two arms of the slot $b$. The angles of the reflectors are determined by the relative positions of the lamp D and the corresponding windows $c$, $c'$. The two centre reflectors E and centre windows $c$, $c'$ may be illuminated when the apparatus is in normal central position, in which the aircraft is travelling in a straight fore and aft path, and the central portion $b'$ of the screen slot is symmetrically placed with reference to the indicator, the centre then exposing the two centre reflectors and the corresponding windows to the lamp D.

The rotating screen or shutter B is operated from the gyroscope through the slotted arm $b^2$, a pin $a'$ on the end of the gyro arm $a$ extending into the slot. In the central or normal position of the indicator the pin $a'$ is close to the axis of the screen B so that the angular movement of the gyroscope is considerably magnified at the screen, while for larger angles of movement, owing to the displacement of the pin $a'$ in the slot of the arm $b^2$, the movement of the indicator relatively to the gyroscope is progressively reduced. The indicator is, therefore, much more sensitive for small angles than for large angles, which is desirable for purposes of control of the aircraft.

The two sets of windows $c$, $c'$ are preferably of different colours, so as to show different coloured lights according to the direction in which the gyroscope precesses, that is according to the direction in which the aircraft is turning. When the two inner lights are shown the aircraft is flying approximately straight, while on the shutter or screen B turning to one side or the other one of the centre lights is cutout, and one two or more additional lights on the side corresponding to the turning movement of the aircraft are shown, owing to the exposure by an increased length of the staggered slot arm $b$ of the apertures $f$ in the fixed screen F. Owing to the staggering of the slot arms each arm can expose only the apertures $f$ which lie on one side of the centre, the other set of apertures and reflectors lying in the plane of the second slot arm. Both the direction and the rate of turn of the aircraft are, therefore, shown in a prominent manner to the pilot.

In the modification shown in Figures 4, 5 and 6, the rotatable cylindrical screen B' is directly mounted on the gyroscope A so as to turn with the gimbal on precession of the gyroscope taking place. The screen B' is provided with a slot $b$ having two staggered arms connected by a central portion $b'$ of double width, as in the construction already described, this screen turning within the fixed cylindrical screen F', provided with a number of narrow slots or slits $f'$ arranged in two staggered rows as shown in Figure 6, exposing the reflectors E (which are arranged, as before, in two planes corresponding to the position of the slots $f'$) to the light of the lamp D according to the position to which the gyroscope and screen B' turn. The arrangement of outer casing C and windows $c$, $c'$ is substantially on the same lines as that already described, and the windows are preferably equally spaced, but to obtain relative increase of the scale of indication towards the centre the slits $f'$ may be arranged at variable distances apart, the distances increasing from the centre, as indicated in Figure 6. The displacement of the slits lies, of course, within the equal spaces allowed for the successive windows and the reflectors, the inner slits being situated towards the inner sides of the reflectors, while the outer slits are displaced towards the outer sides, the narrowness of the slits allowing for such spacing, while sufficient illumination for indicating purposes is provided. The reflectors are adjusted so as to reflect the light passing through the slits $f'$ from the lamp D forwardly to the centres of the windows.

The rate of turn indicator may also carry an air speed indicator of any convenient type and the pointer G, shown in the drawings in front of the dial $c^2$ of the casing C, serves for an air speed indicator of the usual type, the mechanism (not shown) being enclosed in the casing.

While the connection between the gyroscope and the indicating mechanism in the constructions above mentioned is a mechanical one, electrical or other connections may be employed and any convenient method used for giving a variable scale of indication so that the scale is larger at the centre or near the straight flying position than for the larger angles of turn. Separate lamps may, of course, be employed for the windows instead of the single lamp illustrated, and the shutter or screen may be used to expose one or more of the lights, which take the place of the reflectors in the constructions illustrated.

Figures 7 and 8 illustrate one modification of the device embodying an electrical connection and also separate lamps in place of reflectors. In the arrangement illustrated in these figures there is attached to the gyroscope A an electrical commutator arm $a^2$ turning with the precessional movement of the gyroscope as in the previous arrangements and adapted to make contact with brushes H on either side of the central or neutral position. These brushes are electrically connected to the corresponding electro-magnets J which are in the electrical circuit of brushes H and are excited in order and number corresponding to the position of the commutator arm $a^2$. A plurality of lamps D' is provided, each lamp being placed behind one of the windows $c'$ in the casing C, the windows being arranged in a single row as in the device shown in Figure 5. Behind each window is a small shutter $B^2$, the shutters being under the control of the electro-magnets J so that any electro-magnets which are excited turn the shutters clear of the windows and allow of illumination from the corresponding lamps.

In the device shown in Figures 9 and 10 separate lamps D' are employed as in the modification last described, but in place of the inedpendent shutters $B^2$ a rotatable screen $B^3$ is employed turning on a horizontal axis and operated by the gyroscope A through the connecting arms $a^3$ and $b^3$. The lamps D' are arranged in two rows so that the single slot $b$ in the screen $B^3$ will, as in the slotted screen forms previously described, expose one or more of the lamps D' on either side, the slot $b$ having two staggered arms joined by a central portion. The lamps D' are arranged at different distances from the windows $c$, $c'$, those behind the windows $c$, for example, being placed forward, while those behind the second set of windows $c'$ are placed farther back so as to correspond to the two arms of the slot $b$. The two centre windows may be illuminated when the apparatus is in normal condition.

In the central or normal position of the indicator the pin $a^4$ on the arm $a^3$ which engages in a slot $b^4$ in the arm $b^3$ is close to the axis of the screen $B^3$ so that the angular movement of the gyroscope is considerably magnified at the screen, while for the larger angles of movement owing to the displacement of the pin $a^4$ in the slot of the arm $b^3$ the movement of the indicator relatively to the gyroscope is progressively reduced. The arrangement is on the same lines as that described with reference to Figures 1, 2 and 3.

What I claim and desire to secure by Letters Patent of the United States is:—

1. In an optical gyroscopic turn indicator for aircraft, a gyroscope mounted in the aircraft and provided with a controlling precessional member precessed by the turning of the aircraft, a plurality of illuminative indicating devices, a source of illumination independent of the gyroscope and remaining continuously alight while the instrument is in use, and light controlling means operated by the said precessional member of the gyroscope and interposed between the light source and the said illuminative devices, whereby the latter are lit up by the said source in number and order dependent on the direction and extent of the displacement of the precessional gyroscope member.

2. In an optical gyroscopic turn indicator for aircraft, a gyroscope with a controlling precessional member, a source of illumination, a series of illuminative indicators and a gyroscopically operated light obscuring screen adapted to be interposed between the source of illumination and the said indicators and on displacement by the precessional member of the gyroscope to expose the said indicators to illumination by the said source in number and order depending on the direction and extent of the displacement of the precessional gyroscope member.

3. In indicating apparatus as claimed in claim 2, a set of reflectors between the said gyroscopically operated screen and the indicators and adapted to reflect the light from the source on to the said indicators.

4. In an optical gyroscopic turn indicator for aircraft, two sets of illuminative indicators, one on each side of a central or neutral position, corresponding to straight flight of the aircraft, a controlling gyroscope having a precessional member precessed by the turning of the aircraft, a source of illumination and a gyroscopically operated light controlling screen between the said source and the illuminative indicators, whereby when the screen is displaced by precessional member the said indicators are exposed to illumination by the said source in number and order according to the direction and angle of movement of the precessional member.

5. In an optical gyroscopic turn indicator for aircraft, a gyroscope having a controlling precessional member, a plurality of illuminative indicators, a source of illumination independent of the gyroscope and light controlling means interposed between the said source and the indicators and operated by the precessional gyroscope member, whereby the said indicators are illuminated by the said source in the precessional movement, the light controlling means and the precessional gyroscope member being so related that the displacement of the light controlling means for a given precessional movement is a maximum in the neighborhood of the neutral or unprecessed position and decreases as the angle of precession on either side increases.

6. In a rate of turn indicator as claimed in claim 2, an operating arm mounted on the precessional member of the gyroscope, a co-operating arm on the said screen and a pin and slot connection between the said arms, the said connection being placed beyond the axis of adjustment of the screen.

7. In an optical gyroscopic rate of turn indicator for aircraft, a controlling gyroscope, a series of illuminative indicators arranged in two sets, one on each side of a central or neutral position corresponding to zero rate of turn, a source of illumination independent of the gyroscope, a series of reflectors corresponding to the series of illuminative indicators, which reflectors are staggered in two planes on opposite sides of the central position, a fixed screen having apertures staggered to correspond to the said reflectors and a rotary screen controlled by the gyroscope and slotted in two planes corresponding to the apertures in the fixed screen, whereby the source of illumination illuminates the said indicators in number and order according to the precessional movement of the gyroscope.

8. In an optical gyroscopic rate of turn indicator for aircraft, a controlling gyroscope, a casing having a series of windows in its face arranged in two sets, one on each side of a central or neutral position, a set of reflectors for each set of windows, which reflectors are staggered in two planes on opposite sides of the central position, a fixed screen in the casing having apertures corresponding to the said reflectors, a rotary screen of conical form controlled by the gyroscope and having its axis horizontal, which screen is slotted in two planes corresponding to the apertures in the fixed screen, a source of illumination behind the rotary screen and a connection between the said screen and the gyroscope whereby the reflectors are exposed to the source of illumination in number and order depending on the precessional movement of the gyroscope.

PERCY WILLIS GRAY.